United States Patent

Muehlbach et al.

Patent Number: 5,482,998
Date of Patent: Jan. 9, 1996

[54] THERMOPLASTIC MOLDING MATERIALS BASED ON PARTLY AROMATIC COPOLYAMIDES AND POLYOLEFINS

[75] Inventors: Klaus Muehlbach, Gruenstadt; Petra Baierweck, Schifferstadt; Wolfgang F. Mueller, Neustadt; Gerd Blinne, Bobenheim; Gerhard Ramlow, Weinheim, all of Germany

[73] Assignee: BASF Aktiengesellschaft, Ludwigshafen, Germany

[21] Appl. No.: 287,524

[22] Filed: Aug. 8, 1994

Related U.S. Application Data

[63] Continuation of Ser. No. 900,472, Jun. 18, 1992, abandoned.

[30] Foreign Application Priority Data

Jun. 18, 1991 [DE] Germany ............ 41 20 007.1

[51] Int. Cl.⁶ ............... C08L 77/10; C08L 23/26
[52] U.S. Cl. ............... 525/66; 525/92; 525/179; 525/184
[58] Field of Search ............ 525/66, 179, 92, 525/184

[56] References Cited

U.S. PATENT DOCUMENTS

| | | |
|---|---|---|
| 4,078,014 | 3/1978 | Starrweather ............ 525/197 |
| 4,537,949 | 8/1985 | Schmidt ............ 528/335 |
| 4,613,647 | 9/1986 | Yonaiyama et al. ............ 524/514 |
| 4,762,910 | 8/1988 | Nielinger ............ 528/339 |
| 5,006,601 | 4/1991 | Lutz ............ 525/66 |
| 5,013,789 | 5/1991 | Sakumo ............ 525/66 |
| 5,071,924 | 12/1991 | Koch ............ 525/432 |
| 5,122,570 | 6/1992 | Silbramaman ............ 525/66 |
| 5,252,661 | 10/1993 | Reimann ............ 524/514 |

FOREIGN PATENT DOCUMENTS

| | | |
|---|---|---|
| 0291796 | 11/1988 | European Pat. Off. . |
| 0330015 | 8/1989 | European Pat. Off. . |
| 3507128 | 10/1985 | Germany . |
| 160935 | 2/1986 | Japan . |
| 61-028539 | 2/1986 | Japan . |
| 62-158739 | 7/1987 | Japan . |
| 185182 | 2/1988 | Japan . |
| 63-305148 | 12/1988 | Japan . |
| 208614 | 2/1989 | Japan . |
| 254253 | 3/1989 | Japan . |
| 1403797 | 8/1975 | United Kingdom . |
| 2225584 | 6/1990 | United Kingdom . |
| 2226035 | 6/1990 | United Kingdom . |

OTHER PUBLICATIONS

Encyclopedia of Polym. Sci And Eng. J. Wiley & Sons, N.Y. 1988, vol. 11 pp. 365–366.

Primary Examiner—Joseph L. Schofer
Assistant Examiner—I. Zemel
Attorney, Agent, or Firm—Keil & Weinkauf

[57] ABSTRACT

Thermoplastic molding materials contain
A) 4–94% by weight of a partly aromatic, semicrystalline copolyamide having a triamine content of less than 0.5% by weight and composed of
  ($A_1$) 20–90% by weight of units derived from terephthalic acid and hexamethylenediamine,
  ($A_2$) 0–50% by weight of units derived from ε-caprolactam,
  ($A_3$) 0–80% by weight of units derived from adipic acid and hexametheylenediamine and
  ($A_4$) 0–40% by weight of further polyamide-forming monomers,
  the amount of components ($A_2$) or ($A_3$) or ($A_4$) or of mixtures thereof being not less than 10% by weight,
B) 4–94% by weight of a polyolefin homo- or copolymer or a mixture thereof,
C) 2–20% by weight of an adhesion promoter,
D) 0–20% by weight of a toughening polymer and
E) 0–60 % by weight of additives and processing assistants.

9 Claims, 1 Drawing Sheet

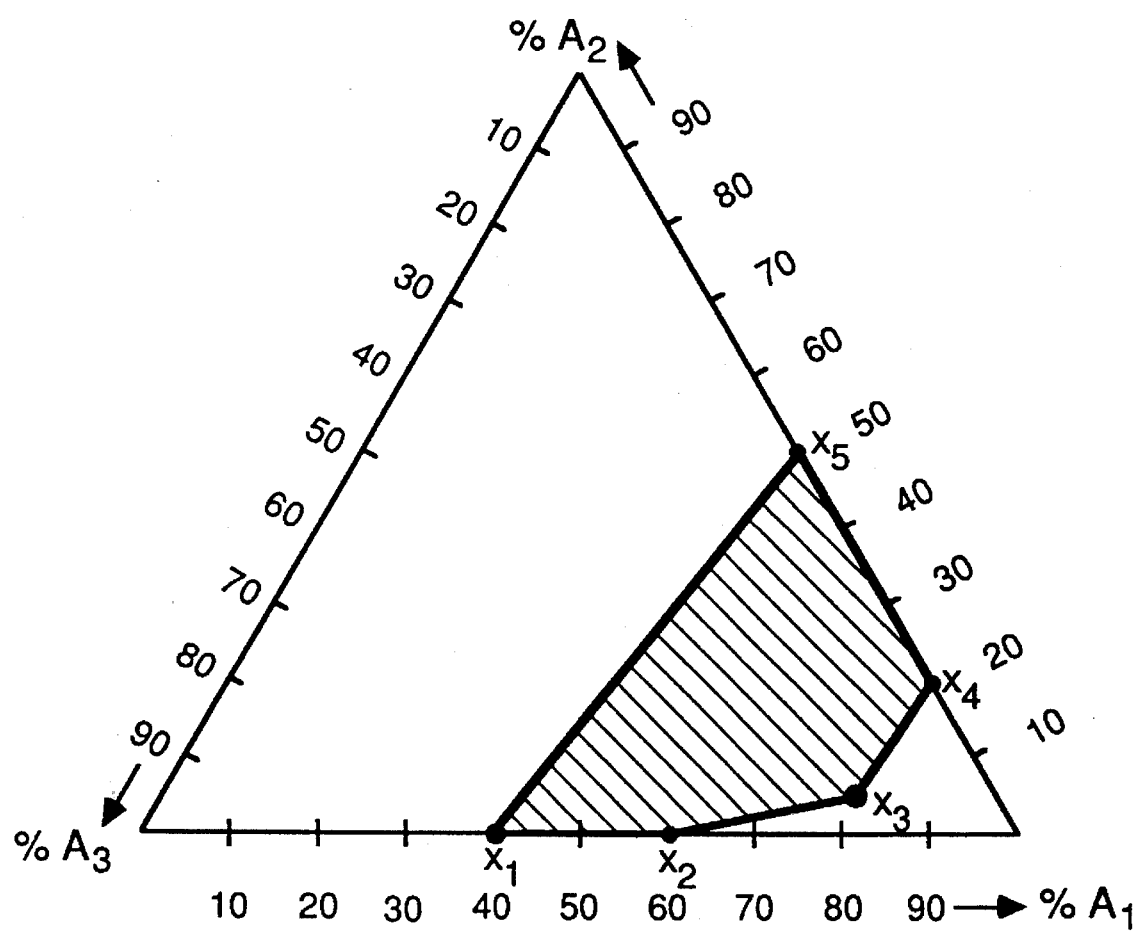

THERMOPLASTIC MOLDING MATERIALS BASED ON PARTLY AROMATIC COPOLYAMIDES AND POLYOLEFINS

This application is a continuation of application Ser. No. 07/900,472, filed on Jun. 18, 1992, abandoned.

The present invention relates to thermoplastic molding materials containing

A) 4–94% by weight of a partly aromatic, semicrystalline copolyamide having a triamine content of less than 0.5% by weight and composed of
- ($A_1$) 20–90% by weight of units derived from terephthalic acid and hexamethylenediamine,
- ($A_2$) 0–50% by weight of units derived from caprolactam,
- ($A_3$) 0–80% by weight of units derived from adipic acid and hexamethylenediamine and
- ($A_4$) 0–40% by weight of further polyamide-forming monomers, the amount of components ($A_2$) or ($A_3$) or ($A_4$) or of mixtures thereof being not less than 10% by weight, B) 4–94% by weight of a polyolefin homo- or copolymer or a mixture thereof,
C) 2–20% by weight of an adhesion promoter,
D) 0–20% by weight of a toughening polymer and
E) 0–60% by weight of additives and processing assistants.

The present invention furthermore relates to the use of a thermoplastic molding material for the production of fibers, films and moldings and to the moldings obtainable.

Polyolefins such as polypropylene, have good solvent resistance, low water absorption and very good processibility so that a combination with the polyamides which generally have higher melting points is desirable for many applications.

Since both polymer phases are generally incompatible, compatibility agents (adhesion promoters) have to be added to blends thereof in order to achieve good dispersing and mutual anchoring of the two polymer phases.

Blends of polyolefins and polyamides are disclosed in GB-A 1 403 797.

The blends contain, as an adhesion promoter, a polypropylene grafted with maleic anhydride.

DE-A 3 507 128 discloses terpolymers of ethylene, n-butyl acrylate and acrylic acid as adhesion promoters in PP/PA blends.

GB-A 2 226 035 discloses adhesion promoter mixtures of polyolefin rubbers, grafted copolymers of polypropylene and a grafted polyolefin rubber.

In general, the prior art molding materials have improved properties compared with molding materials without adhesion promoters, but the toughness, in particular the multi-axial toughness, is unsatisfactory.

Furthermore, these blends give rise to delamination and decomposition problems during processing since the melting points and melt viscosities of the individual polymers generally have too great a difference for a usable blend. In view of the very low water absorption of the polyolefin, however, combination with polyamides, which are used in particular for higher temperatures during continuous use, would be desirable.

It is an object of the present invention to provide thermoplastic molding materials which are based on polyamides and polyolefins, do not have the disadvantages described above and possess good impact strength and greater processing stability.

We have found that this object is achieved, according to the invention, by the thermoplastic molding materials defined at the outset. Preferred materials of this type and their use are described in the subclaims.

The novel thermoplastic molding materials contain, as component A), from 4 to 94, preferably from 20 to 75, in particular from 40 to 70, % by weight of a partly aromatic, semicrystalline copolyamide having a triamine content of less than 0.5, preferably less than 0.3, % by weight and composed of:
- $A_1$) 20–90% by weight of units derived from terephthalic acid and hexamethylenediamine,
- $A_2$) 0–50% by weight of units derived from ε-caprolactam,
- $A_3$) 0–80% by weight of units derived from adipic acid and hexamethylenediamine and
- $A_4$) 0–40% by weight of further polyamide-forming monomers, the amount of components ($A_2$) or ($A_3$) or ($A_4$) or mixtures thereof being not less than 10% by weight.

Component $A_1$) contains 20–90% by weight of units derived from terephthalic acid and hexamethylenediamine.

In addition to the units derived from terephthalic acid and hexamethylenediamine, the copolyamides contain units derived from ε-caprolactam and/or units derived from adipic acid and/or hexamethylenediamine and/or units derived from further polyamide-forming monomers.

The amount of units derived from ε-caprolactam is not more than 50, preferably from 20 to 50, in particular from 25 to 40, % by weight, while the amount of units derived from adipic acid and hexamethylenediamine is up to 80, preferably from 30 to 75, in particular from 35 to 60, % by weight.

The copolyamides may also contain both units of ε-caprolactam and units of adipic acid and hexamethylenediamine; in this case, it is advantageous if the amount of units which are free of aromatic groups is not less than 10, preferably not less than 20, % by weight. The ratio of the units derived from ε-caprolactam to those derived from adipic acid and hexamethylenediamine is not subject to any particular restrictions.

Preferred copolyamides are those whose composition in the ternary diagram is within the pentagon determined by the apices $X_1$ to $X_5$, the points $X_1$ to $X_5$ being defined as follows:
- $X_1$ 40% by weight of units $A_1$)
  60% by weight of units $A_3$)
- $X_2$ 60% by weight of units $A_1$)
  40% by weight of units $A_3$)
- $X_3$ 80% by weight of units $A_1$)
  5% by weight of units $A_2$)
  15% by weight of units $A_3$)
- $X_4$ 80% by weight of units $A_1$)
  20% by weight of units $A_2$)
- $X_5$ 50% by weight of units $A_1$)
  50% by weight of units $A_2$)

In the Figure, the pentagon determined by these points is shown in a ternary diagram.

The polyamides having from 50 to 80, in particular from 60 to 75, % by weight of units derived from terephthalic acid and hexamethylenediamine (units $A_1$)) and from 20 to 50, preferably from 25 to 40, % by weight of units derived from ε-caprolactam (units $A_2$)) have proven particularly advantageous for many intended uses.

In addition to the units $A_1$) to $A_3$) described above, the partly aromatic copolyamides may contain up to 40, preferably 10–30, in particular 20–30, % by weight of further polyamide-forming monomers $A_4$), as known for other polyamides.

Aromatic dicarboxylic acids $A_4$) have 8 to 16 carbon atoms. Examples of suitable aromatic dicarboxylic acids are isophthalic acid, substituted terephthalic and isophthalic acids, such as 3-tert-butylisophthalic acid, and polynuclear dicarboxylic acids, eg. 4,4'- and 3,3'-biphenyldicarboxylic acids, 4,4'- and 3,3'-diphenylmethanedicarboxylic acid, 4,4'- and 3,3'-diphenylsulfonedicarboxylic acid, 1,4- or 2,6-naphthalenedicarboxylic acid and phenoxyterephthalic acid, isophthalic acid being particularly preferred.

Further polyamide-forming monomers $A_4$) may be derived from dicarboxylic acids of 4 to 16 carbon atoms and aliphatic or cycloaliphatic diamines of 4 to 16 carbon atoms and from aminocarboxylic acids or corresponding lactams of 7 to 12 carbon atoms. Merely as suitable monomers of these types, suberic acid, azelaic acid and sebacic acid may be mentioned as typical aliphatic dicarboxylic acids, 1,4-butanediamine, 1,5-pentanediamine, piperazine, 4,4'-diaminodicyclohexylmethane, 2,2-(4,4'-diaminodicyclohexyl)-propane and 3,3'-dimethyl- 4,4'-diaminodicyclohexylmethane may be mentioned as typical diamines and capryllactam, enantholactam, ω-aminoundecanoic acid and laurolactam- may be mentioned as typical lactams or aminocarboxylic acids.

The following compositions of component (A) are particularly preferred:

$A_1$) from 65 to 83% by weight of units derived from terephthalic acid and hexamethylenediamine and $A_4$) from 15 to 35% by weight of units derived from isophthalic acid and hexamethylenediamine or $A_1$) from 50 to 70% by weight of units derived from terephthalic acid and hexamethylenediamine and $A_3$) from 10 to 20% by weight of units derived from adipic acid and hexamethylenediamine and $A_4$) from 20 to 30% by weight of units derived from isophthalic acid and hexamethylenediamine.

If component ($A_4$) contains 4,4'-substituted symmetric dicarboxylic acids, it is advisable to combine these with ($A_1$) and ($A_2$) or ($A_1$) and ($A_3$) to give ternary copolyamides, since otherwise the copolyamide has too high a melting point and only melts with decomposition, which is undesirable.

Partly aromatic copolyamides whose triamine content is less than 0.5, preferably less than 0.3, % by weight have also proven particularly advantageous.

Partly aromatic copolyamides prepared by most known processes (cf. U.S. Pat. No. 4,603,166) have triamine contents which are greater than 0.5% by weight, which leads to a deterioration in the product quality and to problems during continuous production. A triamine which gives rise to these problems is, in particular, dihexamethylenetriamine, which is formed from the hexamethylenediamine used in the preparation.

Copolyamides having a low triamine content have lower melt viscosities with the same solution viscosity in comparison with products of the same composition which have a higher triamine content. This considerably improves both the processability and product properties.

The melting points of the partly aromatic copolyamides are from 270° to 325° C., preferably from 280° to 310° C., this high melting point also being associated with a high glass transition temperature of, as a rule, more than 75° C., in particular more than 85° C. (in the dry state).

Binary copolyamides based on terephthalic acid, hexamethylenediamine and ε-caprolactam and containing about 70% by weight of units derived from terephthalic acid and hexamethyienediamine have melting points in the region of 300° C. and (in the dry state) a glass transition temperature of more than 110° C.

Binary copolyamides based on terephthalic acid, adipic acid and hexamethylenediamine reach melting points of 300° C. or more even with lower contents of about 55% by weight of units derived from terephthalic acid and hexamethylenediamine (HMD), the glass transition temperature being not quite so high as in the case of binary copolyamides which contain ε-caprolactam instead of adipic acid or adipic acid/HMD.

According to the invention, partly aromatic copolyamides are those which have a crystallinity of >10%, preferably >15%, in particular >20%.

The crystallinity is a measure of the proportion of crystalline fragments in the copolyamide and is determined by X-ray diffraction.

The preferred partly aromatic copolyamides having a low triamine content can be prepared by the processes described in EP-A 129 195 and 129 196.

According to these processes, an aqueous solution of the monomers, i.e. in this case the monomers which form the units $A_1$) to $A_4$), is heated to 250°–300° C. under superatmospheric pressure with simultaneous evaporation of water and formation of a prepolymer, the prepolymer and steam are then separated continuously, the steam is rectified and the entrained diamines are recycled. Finally, the prepolymer is passed into a polycondensation zone and is subjected to polycondensation under superatmospheric pressure of 1 to 10 bar and at from 250 to 300° C. In the process, it is essential that the aqueous salt solution is heated under superatmospheric pressure of 1 to 10 bar during a residence time of less than 60 seconds, the conversion advantageously being not less than 93% and the water content of the prepolymer being not more than 7% by weight on emergence from the evaporator zone.

As a result of the short residence time, formation of triamines is substantially prevented.

The aqueous solutions used have, as a rule, a monomer content of from 30 to 70, in particular from 40 to 65, % by weight.

The aqueous salt solution is advantageously passed continuously, at from 50° to 100° C., into an evaporator zone where the aqueous salt solution is heated to 250°–300° C. under superatmospheric pressure of from 1 to 10, preferably from 2 to 6, bar. Of course, the temperature used is above the melting point of the particular polyamide to be prepared.

As already mentioned, it is essential that the residence time in the evaporator zone is not more than 60, preferably from 10 to 55, in particular from 10 to 40, seconds.

The conversion on emergence from the evaporator zone is not less than 93%, preferably from 95 to 98%, and the water content is preferably from 2 to 5, in particular from 1 to 3, % by weight.

It has also proven advantageous to pass the mixture of the prepolymer and steam through a tubular mass transfer zone which is provided with baffles before separation of the phases, immediately after the evaporator zone. The temperatures and pressure conditions used in the evaporator zone are maintained. The baffles, for example packing, such as Raschig rings, metal rings or, in particular, wire mesh packing, produce a large surface area. As a result, the phases, ie. prepolymer and steam, are brought into intimate contact. Consequently, the amount of diamine liberated with steam is considerably reduced. As a rule, a residence time of from 1 to 15 minutes is maintained in the mass transfer zone, which is advantageously in the form of a tube bundle.

The two-phase mixture comprising steam and prepolymer and emerging from the evaporator zone or mass transfer zone is separated. As a rule, separation takes place spontaneously owing to the physical differences in a vessel, the lower part of the vessel advantageously being in the form of a polymerization zone. The vapors liberated consist essentially of steam and diamines, which were liberated in the evaporation of the water. These vapors are passed into a column and rectified. Examples of suitable columns are packed columns, bubble tray columns or sieve tray columns having from 5 to 15 theoretical plates. The column is advantageously operated under pressure conditions identical to those in the evaporator zone. The diamines present in the vapors are thus separated off and recycled to the evaporator zone. It is also possible to feed the diamines to the downstream polymerization zone. The rectified steam obtained is taken off at the top of the column.

The resulting prepolymer which, depending on its conversion, consists essentially of low molecular weight polyamide and possibly residual amounts of unconverted salts and, as a rule, has a relative viscosity of from 1.2 to 1.7 is passed into a polymerization zone. In the polymerization zone, the melt obtained is subjected to polycondensation at from 250° to 330° C., in particular from 270° to 310° C., and under superatmospheric pressure of from 1 to 10, in particular from 2 to 6, bar. Advantageously, the steam evolved here is rectified together with the abovementioned vapors in the column, a residence time of from 5 to 30 minutes preferably being maintained in the polycondensation zone. The resulting polyamide, which, as a rule, has a relative viscosity of from 1.2 to 2.3, is removed continuously from the condensation zone.

In a preferred procedure, the polyamide thus obtained is passed in the form of a melt through a discharge zone with simultaneous removal of the residual water present in the melt. Suitable discharge zones are, for example, devolatilization extruders. The melt thus freed from the water is then extruded and the extrudates are granulated. The granules obtained are advantageously condensed in the solid phase by means of superheated steam at below the melting point, for example from 170° to 240° C., until the desired viscosity is reached. The steam obtained at the top of the column is advantageously used for this purpose.

The relative viscosity, measured in a 1% strength by weight solution in 96% strength by weight $H_2SO_4$ at 23° C., is generally from 2.2 to 5.0, preferably from 2.3 to 4.5, after the solid phase postcondensation.

In another preferred procedure, the polyamide melt discharged from the polycondensation zone is passed into a further polycondensation zone where it is condensed with continuous formation of new surfaces at from 285° to 310° C., advantageously under reduced pressure, for example from 1 to 500 mbar, until the desired viscosity is reached. Suitable apparatuses are known as finishers.

A further process which resembles that described above is described in EP-A 129 196, which may be referred to for further details.

Mixtures of different copolyamides may also be used as component A), any mixing ratio being possible.

The novel molding materials contain, as component B), from 4 to 94, preferably from 23 to 75, in particular from 28 to 55, % by weight of a polyolefin homo- or copolymer or of a mixture thereof.

Component B) generally has a melting point of >90° C., preferably > 125° C., in particular > 160° C.

Examples of suitable polyolefin homopolymers are polyethylene, polypropylene and polybutene, polypropylene being preferred.

Suitable polyethylenes are very low density (LLD-PE), low density (LD-PE), medium density (MD-PE) and high density polyethylene (HD-PE). These are branched polyethylenes having short or long branches or linear polyethylenes, which are prepared in a high pressure process in the presence of free radical initiators (LD-PE) or in a low pressure process in the presence of complex initiators, for example Phillips or Ziegler-Natta catalysts (LLD-PE, MD-PE and HD-PE). The short-chain branches in LLD-PE and MD-PE are introduced by copolymerization with α-olefins (e.g. butene, hexene or octene).

LLD-PE generally has a density of from 0.9 to 0.93 g/cm$^3$ and a melting point (determined by means of differential thermal analysis) of from 120° to 130° C., LD-PE has a density of from 0.915 to 0.935 g/cm$^3$ and a melting point of from 105° to 115° C., MD-PE has a density of from 0.93 to 0.94 g/cm$^3$ and a melting point of from 120° to 130° C. and HD-PE has a density of from 0.94 to 0.97 g/cm$^3$ and a melting point of from 128° to 136° C.

The flow, measured as the melt flow index MFI, is in general from 0.05 to 35 g/10'. The melt flow index corresponds to the amount of polymer which is forced out of the test apparatus standardized according to DIN 53,735 in the course of 10 minutes at 190° C. and under a load of 2.16 kg.

The novel molding materials preferably contain polypropylene as component B).

Suitable polypropylenes are known to the skilled worker and are described in, for example, Kunststoffhandbuch Volume IV, Polyolefine, Carl Hauser Verlag Munich 1969.

The melt volume index MVI according to DIN 53,735 is in general from 0.3 to 80, preferably from 0.5 to 35, g/10 min at 230° C. and under a load of 2.16 kg.

Such polypropylenes are usually prepared by low pressure polymerization using metal-containing catalysts, for example with the aid of titanium- and aluminum-containing Ziegler catalysts or, in the case of polyethylene, also by means of Phillips catalysts based on chromium-containing compounds. The polymerization reaction can be carried out using the reactors customary in industry, in the gas phase, in solution or in suspension.

The polyethylene or polypropylene can be used both in the form of grit and in the form of granules in the preparation of the novel polymer blend. Mixtures of polyethylene and polypropylene may also be used, any mixing ratio being possible.

Other suitable components B) are copolymers of ethylene with ε-olefins, such as propylene, butene, hexene, pentene, heptene and octene, or with nonconjugated dienes, such as norbornadiene and dicyclopentadiene. Copolymers B) are intended to mean both random and block copolymers.

Random copolymers are usually obtained by polymerizing a mixture of different monomers, and block copolymers by successive polymerization of different monomers.

The novel molding materials contain, as component C), from 2 to 20, preferably from 2 to 15, in particular from 2 to 12, % by weight of an adhesion promoter. This is a polymer which has sufficient affinity both to component A) and to B). Accordingly, the interfacial tension between A) and B) is reduced, better phase dispersion being achieved.

Suitable polymers as compatibility agents C) are the polyolefin homo- and copolymers described under B), which contain from 0.1 to 20, preferably from 0.2 to 10, in particular from 0.2 to 5, % by weight (based on 100% by weight of component C)) of functional monomers.

Functional monomers are understood as being monomers which contain carboxyl, anhydride, aide, imide, carboxylic ester, amino, hydroxyl, epoxy, oxazolyl, urethane, urea or lactam groups and additionally have a reactive double bond.

Examples of these are methacrylic acid, maleic acid, maleic anhydride, fumaric acid, itaconic acid and the alkyl esters of the abovementioned acids and amides thereof, maleimide, allylamine, allyl alcohol, glycidyl methacrylate, vinyl- and isopropenyloxazoline and methacryloylcaprolactam.

The functional monomers can be introduced into the polymer chain by copolymerization or by grafting. Grafting can be carried out either in solution or in the melt, and free radical initiators, such as peroxides, hydroperoxides, peresters and percarbonates, may be present.

Adhesion promoters of this type are in general commercially available (Polybond®, Exxelor®, Hostamont®, Admer®, Orevac®, Epolene® and Hostaprime®).

The novel molding materials may contain from 0 to 20, preferably from 0 to 15, in particular from 0 to 10, % by weight of a toughening polymer (also referred to as impact modifier, elastomer or rubber).

Component D) has in general at least one elastomer phase whose softening temperature is below −25° C., preferably below −30° C.

Toughening polymers which increase the toughness of the component B) are copolymers of ethylene with propylene and, if required, with a nonconjugated diene (EP or EPDU rubbers), the ethylene content being preferably 45, in particular 50, % by weight (based on 100% by weight of component D)).

Such impact modifiers are generally known, and reference may therefore be made here to the publication by Cartasegna in Kautschuk, Gummi, Kunststoffe 39 (1986), 1186–1191, for further details.

Rubbers which increase the toughness of polyamides generally have two esential features: they contain an elastomeric component which has a glass transition temperature of less than −10° C., preferably less than −30° C., and they contain at least one functional group which can react with the polyamide. Examples of suitable functional groups are carboxyl, anhydride, carboxylic ester, carboxamide, carboximide, amino, hydroxyl, epoxy, urethane and oxazolyl groups.

Examples of rubbers which increase the toughness of polyamides are EP and EPDM rubbers which have been grafted with the abovementioned functional groups. Suitable graft reagents are, for example, maleic anhydride, itaconic acid, acrylic acid, glycidyl acrylate and glycidyl methacrylate. These monomers can be grafted onto the polymer in the melt or in solution in the presence or absence of a free radical initiator, such as cumyl hydroperoxide.

Copolymers of α-olefins may also be mentioned here. The α-olefins are usually monomers of 2 to 8 carbon atoms, preferably ethylene and propylene. Alkyl acrylates or alkyl methacrylates which are derived from alcohols of 1 to 8 carbon atoms, preferably from ethanol, butanol or ethylhexanol, and reactive comonomers, such as acrylic acid, methacrylic acid, maleic acid, maleic anhydride or glycidyl (meth)acrylate, and furthermore vinyl esters, in particular vinyl acetate, have proven suitable comonomers. Mixtures of different comonomers can also be used. Copolymers of ethylene with ethyl or butyl acrylate and acrylic acid and/or maleic anhydride have proven particularly suitable.

The copolymers can be prepared in a high pressure process at from 400 to 4500 bar or by grafting the comonomers onto the poly-α-olefin. The proportion of the α-olefin in the copolymer is in general from 99.95 to 55% by weight.

A further group of suitable elastomers comprises core/shell graft rubbers. These are graft rubbers which have been prepared in emulsion and consist of at least one rigid and one flexible component. A rigid component is usually understood as being a polymer having a glass transition temperature of not less than 25° C., while a flexible component is understood as being a polymer having a glass transition temperature of not more than 0° C. These products have a structure comprising a core and at least one shell, the structure being determined by the order of addition of the monomers. The flexible components are derived in general from butadiene, isoprene, alkyl acrylates or alkyl methacrylates and, if required, further comonomers. Examples of suitable comonomers here are styrene, acrylonitrile and crosslinking or graft-linking monomers having more than one polymerizable double bond, such as diallyl phthalate, divinylbenzene, butanediol diacrylate or triallyl (iso)cyanurate. The rigid components are derived in general from styrene, α-methylstyrene and copolymers thereof, preferred comonomers here being acrylonitrile, methacrylonitrile and methyl methacrylate.

Preferred core/shell graft rubbers contain a flexible core and a rigid shell or a rigid core, a first flexible shell and at least one other rigid shell. The incorporation of functional groups, such as carbonyl, carboxyl, anhydride, amide, imide, carboxylic ester, amino, hydroxyl, epoxy, oxazolyl, urethane, urea, lactam or halobenzyl groups, is preferably effected here by the addition of suitable functionalized monomers during the polymerization of the final shell. Suitable functionalized monomers are, for example, maleic acid, maleic anhydride, mono- or diesters of maleic acid, tert-butyl (meth)acrylate, acrylic acid, glycidyl (meth)acrylate and vinyloxazoline. The amount of monomers having functional groups is in general from 0.1 to 25, preferably from 0.25 to 15, % by weight, based on the total weight of the core/shell graft rubber. The weight ratio of flexible to rigid components is in general from 1:9 to 9:1, preferably from 3:7 to 8:2.

Such rubbers which increase the toughness of polyamides are known per se and are described in, for example, EP-A 208 187.

A further group of suitable impact modifiers are thermoplastic polyester elastomers. Polyester elastomers are understood as being segmented copolyetheresters which contain long-chain segments derived as a rule from poly(alkylene) ether glycols and short-chain segments derived from low molecular weight diols and dicarboxylic acids. Products of this type are known per se and are described in the literature, for example in U.S. Pat. No. 3,651,014. Corresponding products are also commercially available under the names Hytrel® (Du Pont), Arnitel® (Akzo) and Pelprene® (Toyobo Co. Ltd.).

Mixtures of different rubbers can of course also be used.

The novel molding materials may contain from 0 to 60, preferably up to 50, in particular up to 40, % by weight of additives and processing assistants or mixtures thereof.

Examples of fillers are carbon fibers or glass fibers in the form of woven glass fabrics, glass mats, glass rovings and glass spheres, and wollastonite.

Preferred fibrous reinforcing agents (component E)) are carbon fibers, potassium titanate whiskers, Aramid fibers and particularly preferably glass fibers. When glass fibers are used, they may be provided with a size or with an adhesion promoter for better compatibility with the thermoplastic polyamide (A) or with the polyolefin polymer (B). In general, the carbon and glass fibers used have a diameter of from 6 to 20 μm.

These glass fibers may be incorporated both in the form of short glass fibers and in the form of rovings. In the finished injection molding, the mean length of glass fibers is preferably from 0.08 to 0.5 mm.

Suitable particulate fillers are amorphous silica, asbestos, magnesium carbonate, chalk, powdered quartz, mica, talc, feldspar, barium sulfate and in particular calcium silicates, such as wollastonite and kaolin (in particular calcined kaolin).

Preferred combinations of fillers are, for example, 20% by weight of glass fibers with 15% by weight of wollastonite and 15% by weight of glass fibers with 15% by weight of wollastonite.

The novel molding materials may furthermore contain flameproofing agents in amounts of from 0 to 25, preferably up to 15, % by weight, based on the total weight of the molding materials.

All known flameproofing agents are suitable, for example polyhalobiphenyl, polyhalodiphenyl ether, polyhalophthalic acid and derivatives thereof, polyhalooligocarbonates and -polycarbonates, the corresponding bromine compounds being particularly effective.

Examples of these are polymers of 2,6,2',6'-tetrabromobisphenol A, of tetrabromophthalic acid, of 2,6-dibromophenol and of 2,4,6-tribromophenol and derivatives thereof.

A preferred flameproofing agent is elemental red phosphorus. As a rule, the elemental phosphorus can be desensitized or coated with, for example, polyurethanes or other aminoplasts. In addition, masterbatches of red phosphorus, for example in a polyamide, elastomers or polyolefin are suitable.

1,2,3,4,7,8,9,10,13,13,14,14-Dodecachloro- 1,4,4a,5,6, 6a,7,10,10a,11,12,12a-dodecahydro-1,4,7,10-dimethanodibenzo[ a,e]cyclooctane (Dechlorane® Plus, Occidental Chemical Corp.) and, if required, a synergistic agent, e.g. antimony trioxide, are particularly preferred.

Further phosphorus compounds are organophosphorus compounds, such as phosphonates, phosphinates, phosphinites, phosphine oxides, phosphines, phosphites or phosphates. An example is triphenylphosphine oxide. This may be used alone or as a mixture with hexabromobenzene or as a chlorinated biphenyl or red phosphorus and, alternatively, antimony oxide.

Typical preferred phosphorus compounds which can be used according to the present invention are those of the following general formula

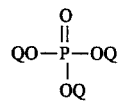

where Q is hydrogen or identical or different hydrocarbon radicals or halohydrocarbon radicals, such as alkyl, cycloalkyl, aryl, alkyl-substituted aryl or aryl-substituted alkyl, provided that at least one of the radicals Q is aryl. Examples of such suitable phosphates are phenyl bisdodecyl phosphate, phenyl bisneopentyl phosphate, phenyl ethylene hydrogen phosphate, phenyl bis-(3,5,5'-trimethylhexyl) phosphate, ethyl diphenyl phosphate, 2-ethylhexyl di-p-toluyl phosphate, diphenyl hydrogen phosphate, bis-(2-ethylhexyl) phenyl phosphate, tri-(nonylphenyl) phosphate, phenyl methyl hydrogen phosphate, didodecyl p-tolyl phosphate, tricresyl phosphate, triphenyl phosphate, dibutyl phenyl phosphate and diphenyl hydrogen phosphate. The preferred phosphates are those in which each radical Q is aryl. The most preferred phosphate is triphenyl phosphate. The combination of triphenyl phosphate with hexabromobenzene and antimony trioxide is also preferred.

Other suitable flameproofing agents are compounds which contain phosphorus-nitrogen bonds, such as phosphonitrile chloride, phosphoric ester amides, phosphoric ester amines, phosphoramides, phosphonamides, phosphinamides, tris-(aziridinyl)-phosphine oxide or tetrakis-(hydroxymethyl)-phosphonium chloride. These flame-retardant additives are for the most part commercially available.

Further halogen-containing flameproofing agents are tetrabromobenzene, hexachlorobenzene and hexabromobenzene as well as halogenated polystyrenes and polyphenylene ethers.

The halogenated phthalimides described in DE-A- 19 46 924 may also be used. Among these, N,N'-ethylenebistetrabromophthaimide has become particularly important.

The novel molding materials may furthermore contain conventional additives and processing assistants. The amount of these is in general up to 20, preferably up to 10, % by weight, based on the total weight of components A) to E).

Conventional additives are, for example, stabilizers and antioxidants, heat stabilizers and UV stabilizers, lubricants and mold release agents, dyes, pigments and plasticizers.

Antioxidants and heat stabilizers which may be added to the thermoplastic materials according to the invention are, for example, sterically hindered phenols, hydroquinones, substituted members of this group and mixtures of these compounds, which can be used preferably in concentrations of up to 1% by weight, based on the weight of the mixture.

Examples of UV stabilizers are various substituted resorcinols, salicylates, benzotriazoles and benzophenones, which are used in general in amounts of up to 2% by weight.

Materials for increasing the shielding against electromagnetic waves, such as metal flakes, powders or fibers or metal-coated fillers, may be present.

Lubricants and mold release agents, which as a rule are added in amounts of up to 5% by weight, based on the thermoplastic material, are stearic acid and alkali metal and alkaline earth metal salts, stearyl alcohol, alkyl stearates and stearamides, as well as esters of glycerol or of pentaerythritol with long-chain fatty acids.

The additives also include stabilizers which prevent the decomposition of the red phosphorus in the presence of humidity and atmospheric oxygen. Examples are compounds of cadmium, of zinc, of aluminum, of antimony, of tin, of magnesium and of boron. Particularly suitable compounds are, for example, oxides of the stated metals as well as carbonates or basic carbonates, hydroxides and salts of organic or inorganic acids, such as acetates, phosphates, hydrogen phosphates and sulfates.

The novel thermoplastic molding materials can be prepared by conventional processes by mixing the starting components in a conventional mixing apparatus, such as an extruder, preferably a twin-screw extruder, a Brabender or Banbury mill or a kneader. After the extrusion, the extrudate is cooled and comminuted.

The novel molding materials possess good mechanical properties, in particular good impact strength. Processing to give moldings is effected without significant delamination or decomposition and is reproducible to a high degree.

Because of these properties, moldings of the novel molding materials are suitable for components in mechanical engineering, the sports article sector, etc.

EXAMPLES

The following components were used for the preparation of novel molding materials and comparative products:

Component A/1

Copolyamide containing 70% by weight of units derived from terephthalic acid and hexamethylenediamine and 30% by weight of units derived from ε-caprolactam. This product was prepared as follows:

An aqueous solution consisting of 35 kg of ε-caprolactam, 55 kg of terephthalic acid, 38.5 kg of hexamethylenediamine and 128.5 kg of water was fed from a heated storage container at about 80° C. at a rate corresponding to an amount of polyamide of 5 kg/hour by means of a metering pump into a tubular evaporator arranged partly horizontally and partly vertically. The evaporator had been heated by means of a liquid heating medium which had a temperature of 295° C. and was vigorously circulated. The evaporator had a length of 3 m, a capacity of 180 ml and a heat-transmitting surface area of about 1300 cm². The residence time in the evaporator was 50 sec. The mixture comprising prepolymer and steam and emerging from the evaporator had a temperature of 290° C. and was separated into steam and melt in a separator. The melt remained in the separator for a further 10 minutes and was then extruded by means of an extruder having a devolatilization zone, solidified in a water bath and then granulated. The separator and the evaporator zone were kept at 5 bar by a pressure-maintaining means which was arranged downstream of the column. The steam separated off in the separator was passed into a packed column which had about 10 theoretical plates and into which about 1 l of vapor condensate per hour was introduced at the top in order to generate a reflux. A temperature of 152° C. was established at the top of the column. Steam emerging after the relief valve was condensed and contained less than 0.05% by weight of hexamethylenediamine and less than 0.1% by weight of ε-caprolactam. An aqueous solution of hexamethylenediamine which contained 80% by weight of hexamethylenediamine and from 1 to 3% by weight of ε-caprolactam, based in each case on polyamide produced, was obtained as the bottom product of the column. This solution was added to the starting salt solution again via a pump before the entrance into the evaporator.

After the evaporator, the prepolymer had a relative viscosity of 1.25, measured in 98% strength by weight sulfuric acid at 20° C. and, according to a terminal group analysis, at a conversion of from 93 to 95%. The content of bishexamethylenetriamine was from 0.1 to 0.15% by weight, based on polyamide.

After the polymer melt emerged from the separator, the polyamide had a very light natural color and an extremely low content of bishexamethylenetriamine of 0.17% and a relative viscosity of from 1.65 to 1.80.

The product contained roughly equivalent amounts of terminal carboxyl and amino groups.

The content of extractables (extraction with methanol) was from 3.1 to 3.3% by weight.

In the discharge extruder, the melt was then let down to atmospheric pressure and underwent virtually no further condensation during a residence time of less than 1 minute. The resulting granules were condensed to a final viscosity η-rel of 2.50 by continuous solid phase condensation with superheated steam at 195° C. during a residence time of 30 hours. The content of extractables was then 0.2% by weight (methanol extract).

Comparative components:

A/V1: Nylon 6 having a relative viscosity η-rel (in concentrated sulfuric acid, 23° C., 1 g/dl) of 3.3

A/V2: Nylon 66 having a relative viscosity η-rel (in concentrated sulfuric acid, 23° C., 1 g/dl) of 2.5

Components B

|  |  | MVI (230/2.16) [g/10'] (DIN 53,735) | Tensile modulus of elasticity [N/mm²] (DIN 53,457) | Melting point [°C.] (ISO 3146) |
|---|---|---|---|---|
| B/1 | Polypropylene (Novolen ® 1100H from BASF AG) | 2.5 | 1400 | 165 |
| B/2 | Polypropylene (Novolen ® 1300L from BASF AG) | 7 | 650 | 158 |
| B/3 | Block polypropylene copolymer (Novolen ® 2300KX from BASF AG) | 6 | 1250 | 162 |
| B/4 | Random copolymer (Novolen ® 3200HX from BASF AG) | 2.5 | 800 | 146 |

Components C

C/1: Polypropylene grafted with 6% by weight of acrylic acid (MFI (ISO 1133) = 40 g/10'); Polybond® 1001 from BP)

C/2: Polypropylene grafted with 0.3% by weight of maleic anhydride (Exxelor® PO 2011 from Exxon)

C/3: Polypropylene modified with 0.2% of maleic anhydride; MFI (230/2.16)=4, melting point=165° C. (Admer® QF 500 E from Mitsui Petrochemical Ind. ).

Components D

D/1: Maleic anhydride-modified EP rubber (0.7% of maleic anhydride) MFI (230/2.16)=3 (Exxelor® VA 1803 from Exxon)

D/2: Terpolymer of ethylene, n-butyl acrylate and acrylic acid (60/35/5) MFI (190/2.16) = 10 g/10'

Component E

Glass fibers having a polyurethane size (mean fiber diameter: 10 μm).

Preparation of the molding materials

Components A) to D) were metered at 260° C. (V1*), 280° C. (V2*) and 310° C. (1–6) into a twin-screw extruder and melted and, if necessary, component E) was metered into a second zone of the extruder via a feed screw. The melt was discharged, passed through a water bath and granulated.

The granules were converted into standard test specimens or circular disks (diameter= 60 mm) at the abovementioned temperatures on an injection molding machine. The following measurements were carried out: Notched impact strength $a_K$ [kJ/m²] according to DIN 53,453 Total penetration energy $W_{50}$ [Nm] according to DIN 53,443

The compositions of the molding materials and the results of the measurements are shown in the Table.

TABLE

| Example | Composition [% by weight] | | | | | | $a_K$ [kJ/m$^2$] | $W_{50}$ [Nm] |
|---|---|---|---|---|---|---|---|---|
| V1* | A/V1 60 | B/2 35 | C/3 5 | — | — | | 14 | 9.1 |
| V2* | A/V2 60 | B/2 35 | C/3 5 | — | — | | 12 | 0.5 |
| 1 | A/1 60 | B/2 35 | C/3 5 | — | — | | 17 | 16 |
| 2 | A/1 55 | B/1 35 | C/2 5 | D/1 5 | — | | 18 | 21 |
| 3 | A/1 55 | B/1 40 | C/1 2 | D/1 3 | — | | 16 | 12 |
| 4 | A/1 50 | B/3 45 | C/1 5 | — | — | | 17 | 19 |
| 5 | A/1 60 | B/4 30 | C/3 10 | — | — | | 20 | 24 |
| 6 | A/1 60 | B/1 35 | C/1 5 | — | E 30 | | 8.5 | n.d. | n.d. = Not determined
*For comparison
The mixtures additionally contained 0.25% by weight, based on 100% by weight of A) to E), of talc

We claim:

1. A thermoplastic molding material containing

A) 4–94% by weight of a partly aromatic, semicrystal-line copolyamide having a triamine content of less than 0.5% by weight and composed of
   ($A_1$) 20–90% by weight of units derived from terephthalic acid and hexamethylenediamine,
   ($A_2$) 0–50% by weight of units derived from ε-caprolactam,
   ($A_3$) 0–80% by weight of units derived from adipic acid and hexamethylenediamine and
   ($A_4$) 0–40% by weight of further polyamide-forming monomers, the amount of components ($A_2$) or ($A_3$) or ($A_4$) or of mixtures thereof being not less than 10% by weight, B) 4–94% by weight of a polyolefin homo- or copolymer or a mixture thereof, C) 2–20% by weight of a compatibility agent.

D) 0–20% by weight of a toughening polymer, if desired

E) 0–60% by weight of other additives and processing assistants.

2. A thermoplastic molding material as defined in claim 1, wherein component B) consists of polypropylene or polyethylene or of an ethylene/propylene copolymer or of a mixture thereof.

3. A thermoplastic molding material as defined in claim 1, wherein component C) is composed of a homo- or copolymer of at least one α-olefin which contains from 0.1 to 20% by weight, based on 100% by weight of component C), of functional monomers.

4. A thermoplastic molding material as defined in claim 1, wherein the partly aromatic copolyamide A) contains
   $A_1$) 50–80% by weight of units derived from terephthalic acid and hexamethylenediamine and
   $A_2$) 20–50% by weight of units derived from ε-caprolactam.

5. A thermoplastic molding material as defined in claim 1, wherein the partly aromatic copolyamide A) contains
   $A_1$) 25–70% by weight of units derived from terephthalic acid and hexamethylenediamine and
   $A_3$) 30–75% by weight of units derived from adipic acid and hexamethylenediamine.

6. A thermoplastic molding material as defined in claim 1, wherein the partly aromatic copolyamide A) contains
   $A_1$) from 50 to 70% by weight of units derived from terephthalic acid and hexamethylenediamine and
   $A_3$) from 10 to 20% by weight of units derived from adipic acid and hexamethylenediamine and
   $A_4$) from 20 to 30% by weight of units derived from isophthalic acid and hexamethylenediamine.

7. A thermoplastic molding material as defined in claim 1, wherein component A) has a melting point of from 270° to 325° C.

8. A molding obtainable from a thermoplastic molding material as defined in claim 1.

9. The thermoplastic molding composition of claim 3, wherein component C) comprises 0.2 to 10% by weight of functional monomers.

* * * * *